Patented Aug. 24, 1943

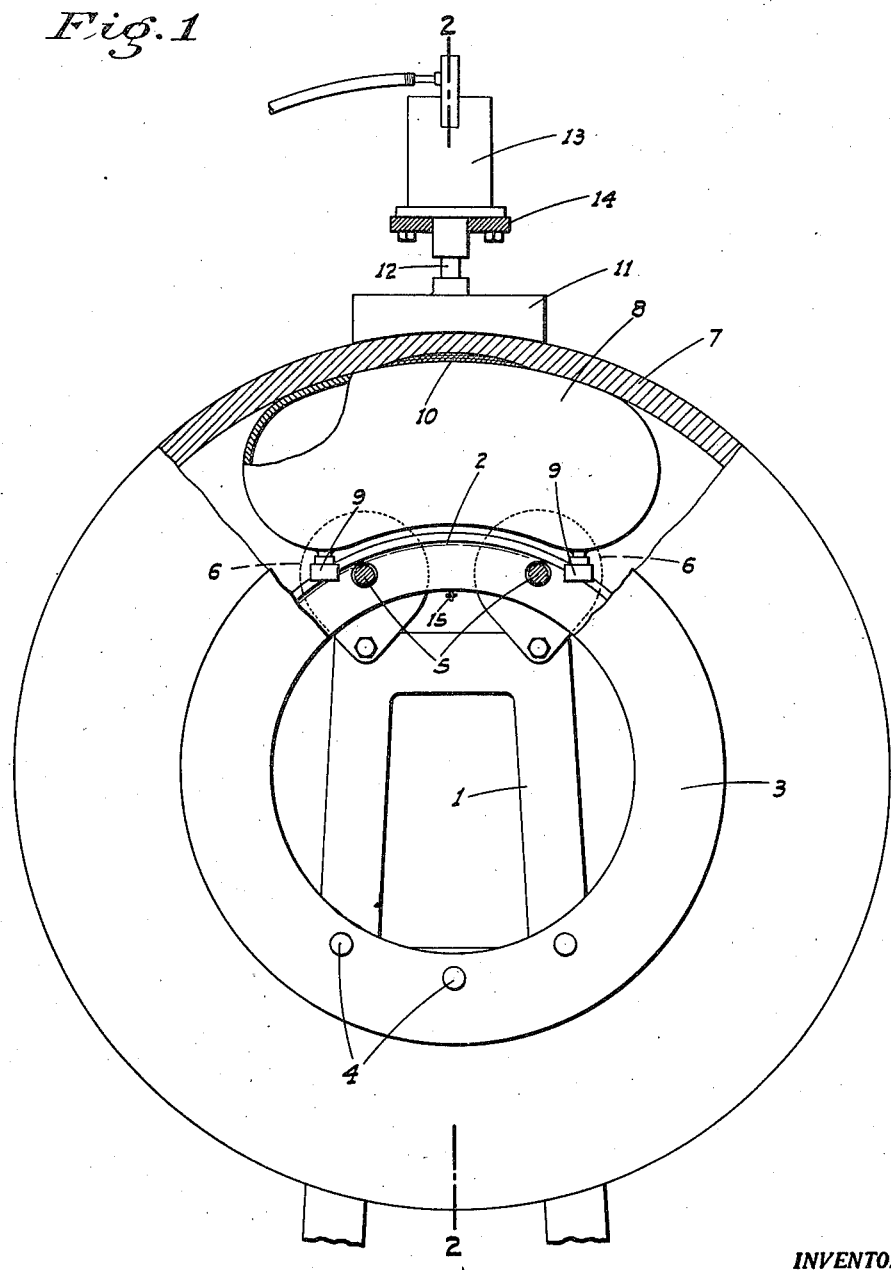

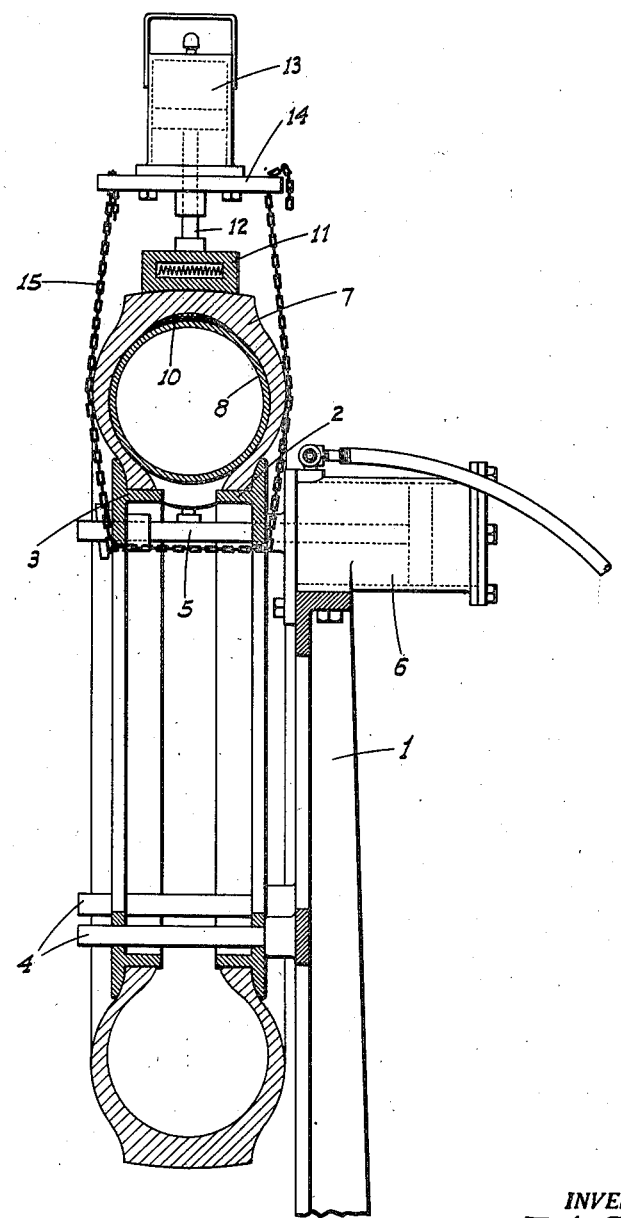

2,327,781

UNITED STATES PATENT OFFICE 2,327,781

TIRE REPAIRING MOLD

Edwin A. Glynn, Lodi, Calif., assignor to Super Mold Corporation of California, a corporation Application January 12, 1942, Serial No. 426,383

5 Claims. (Cl. 18—18)

This invention relates to tire repair or spot vulcanizing molds such as I use to repair and patch blow-outs etc. as distinguished from full retread or recap molds. As at present constructed such repair molds make use of a segmental rubber bag placed inside the tire to form a core, and which is subjected to high heat and pressure to provide the necessary vulcanizing action for the patch or shoe within the tire. Such bags, however, not only deteriorate very quickly so that they need frequent replacing, but in deteriorating they form a serious source of danger in that they are liable to blow out and injure the workmen.

It is therefore the principal object of my invention to avoid the possibilities of such dangerous occurrence by providing a mold of this type which includes a rigid metal core to take the pressure of the bag, which is sufficiently strong to withstand bursting from the steam pressure to which it is subjected when in operation.

Another object is to provide what I believe to be a novel means, cooperating with this internal core, for applying the necessary pressure against the outside of the tire, and which is readily adjustable so that any part of the tread or the sidewalls of the tire may be thus subjected to the pressure and the necessary vulcanizing heat localized at the exact point desired.

I have also provided an improved means for supporting the wire and drawing the same snugly about the core.

These objects I accomplish by means of such structure and relative arrangement of parts as will fully appear by a perusal of the following specification and claims.

In the drawings similar characters of reference indicate corresponding parts in the several views:

Figure 1 is a fragmentary front elevation of my improved repair mold, partly in section, and showing a tire as mounted thereon.

Figure 2 is a transverse section on line 2—2 of Fig. 1.

Referring now more particularly to the characters of reference on the drawings, the mold comprises a stand 1 of suitable form which in front removably supports a flanged tire-bead supporting ring 2. A similar ring 3 to cooperate with the ring 2 in opposed relation to engage the other tire bead, is slidably supported at the bottom for axial movement relative to the ring 2 by rods 4 mounted on the stand and projecting through the rings radially inward of the tire engaging portion. Adjacent the top the ring 3 is detachably connected, radially inward of its tire supporting portion, to the horizontally spaced piston rings 5 of air power cylinders 6 which are mounted on the stand 1 back of the ring 2; the rods 4 and 5 being, of course, parallel to the axis of the rings. By means of this construction the ring 3 may be withdrawn from the rods to enable a tire 7 to be slid onto or off the ring 2, and when the ring 3 is replaced and connected to the piston rods 5 and pressure then applied to the cylinders, the rings will be forceably drawn toward each other.

The core, which is the main feature of my invention, comprises a hollow, rigid arcuate or segmental metal member 8 having rounded ends. The core is of circular form in cross section to correspond with the internal cross sectional form of the tire, while its radius of longitudinal curvature is the same as the corresponding internal diameter of the tire.

Intake and outlet fittings 9 are mounted on the core in depending relation at its lowest points for connection with flexible steam hoses whereby steam at the necessary vulcanizing heat and pressure may be circulated through the core. The core is sufficiently thick to provide the necessary factor of safety against bursting from the pressure generated by the steam at the necessary high vulcanizing temperature, and is of a non-corrosive material so that it will not rust and deteriorate and will thus last indefinitely.

In the example shown the core is vulcanizing a laminated patch or shoe 10 of conventional form inside the tire directly under the tread, and in mounting the tire on the supporting rings, it is disposed so that the patch is at the top or directly between the air cylinders and the core is likewise centered relative to the patch as shown; the core being of course inserted before the clamping ring 3 is mounted in position.

In order to apply pressure and heat to the outside of the tire in the zone of the patch, I provide a pressure pad 11 curved to conform to the curvature of the tire both transversely and circumferentially thereof, and which may be of the electrically heated type at present available on the market. This pad is detachably connected to the piston rod 12 of an air bag cylinder 13 which at its lower end is secured on a support base 14 projecting laterally beyond the sides of the cylinder. The base at its sides is detachably and adjustably engaged by the end portions of a chain 15, or the like, which extends about the tire and engages under the top portion of the rings 2 and 3 between the piston rods 5. Pressure applied to the cylinder 13 to force the piston rod 12 down after the chain is initially engaged as described, will therefore place the chain under tension and causes the pad 11 to be pressed firmly against the tire. Since the chain has no direct connection with the tire supporting rings, the pad 11 may be shifted about the tire in a transverse plane so as to engage not only the tread but either side-wall of the tire as well, depending on the location of the break or fracture in the tire.

The forceful pulling together of the rings 2 and 3 by the air cylinders 6 causes the tire to be brought into close contact with the core so that the patch 19 throughout its extent is firmly pressed against the tire and core as is desirable to obtain the best results.

The mold is particularly intended for large size tires and it is, of course, understood that the supporting rings and cores of different sizes may be provided for use with different sized tires.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention, what I claim as new and useful and desire to secure by Letters Patent is:

1. A tire repair mold including means to support the tire at the beads, a segmental heating core disposable within the tire, a pressure pad to engage the outside of the tire in cooperating relation to the core, a pressure cylinder unit having a projecting piston rod secured to the pad, a base on which the cylinder is mounted and means to removably mount the base in connection with the tire and against radially outward movement relative thereto.

2. A tire repair mold including means to support the tire at the beads, a segmental heating core disposable within the tire, a pressure pad to engage the outside of the tire in cooperating relation to the core, a pressure cylinder unit having a projecting piston rod secured to the pad, a base on which the cylinder is mounted, the tire supporting means comprising bead engaging rings, and a flexible member embracing the tire and rings transversely thereof and connected at its ends to the base.

3. A tire repair mold comprising a stand, a relatively movable ring member to engage and support one bead portion of a tire disposed away from the stand and facing the same, a relatively stationary ring member to engage the other bead of a tire disposed between the movable ring and stand and supported from the latter, means disposed radially in from the tire engaging area of the members removably supporting the movable member from the stand, a power cylinder mounted on the stand with its axis parallel to that of the ring members and so that the stationary ring member is between the cylinder and movable ring member, a piston rod projecting from the cylinder past the stationary member and through the movable member clear of the tire engaging portions thereof and a detachable connection between the rod and said movable member.

4. A tire repair mold comprising a stand, a ring member to engage one bead portion of a tire disposed adjacent the stand on one side thereof, rods projecting from said side of the stand parallel to the axis of the ring member and on which the latter is removably slidable and by which it is supported, another ring member to engage the other bead portion of the tire also removably slidable on the rods and supported thereby, and means detachably applied to one ring member to relatively move the members axially of each other.

5. A mold as in claim 4, in which the rods are disposed radially in from the tire engaging portions of the members.

EDWIN A. GLYNN.